United States Patent
Ryu et al.

(10) Patent No.: US 9,470,934 B2
(45) Date of Patent: Oct. 18, 2016

(54) LIQUID CRYSTAL DISPLAY

(71) Applicant: Samsung Display Co., Ltd., Yongin, Gyeonggi-Do (KR)

(72) Inventors: Jang Wi Ryu, Seoul (KR); Cheol Shin, Hwaseong-si (KR); Hak Sun Chang, Yongin-si (KR); Ki Chul Shin, Seongnam-si (KR); Ho Kil Oh, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/107,834

(22) Filed: Dec. 16, 2013

(65) Prior Publication Data

US 2015/0205168 A1    Jul. 23, 2015

(30) Foreign Application Priority Data

Aug. 12, 2013 (KR) .................. 10-2013-0095582

(51) Int. Cl.
  *G02F 1/1343* (2006.01)
  *G02F 1/1362* (2006.01)
  *G02F 1/1337* (2006.01)

(52) U.S. Cl.
  CPC ..... *G02F 1/134309* (2013.01); *G02F 1/13624* (2013.01); *G02F 1/133707* (2013.01); *G02F 2001/134345* (2013.01)

(58) Field of Classification Search
  CPC .................. G02F 1/13439; G02F 1/133707; G02F 1/134309; G02F 1/1393
  USPC .................................. 349/143–144
  See application file for complete search history.

(56) References Cited

U.S. PATENT DOCUMENTS

| 7,110,056 | B2 | 9/2006 | Matsui et al. |
| 7,999,879 | B2 | 8/2011 | Yoshida et al. |
| 8,325,306 | B2 | 12/2012 | Nakanishi et al. |
| 8,847,863 | B2 * | 9/2014 | Iyama et al. ................ 345/87 |
| 8,896,803 | B2 * | 11/2014 | Hanaoka et al. ............. 349/187 |
| 8,947,472 | B2 * | 2/2015 | Tien et al. ................ 345/690 |
| 2003/0193625 | A1 * | 10/2003 | Yoshida et al. ............. 349/43 |
| 2005/0168672 | A1 * | 8/2005 | Tashiro et al. ............. 349/114 |
| 2009/0310075 | A1 * | 12/2009 | Kim ........................... 349/144 |
| 2010/0149464 | A1 * | 6/2010 | Han et al. .................. 349/106 |
| 2010/0182298 | A1 * | 7/2010 | Song .......................... 345/211 |

(Continued)

FOREIGN PATENT DOCUMENTS

| JP | 2010128211 A | 6/2010 |
| KR | 100813349 B1 | 3/2008 |
| KR | 1020140113035 | 9/2014 |

*Primary Examiner* — Hoan C Nguyen

(74) *Attorney, Agent, or Firm* — Cantor Colburn LLP

(57) ABSTRACT

A liquid crystal display includes: a lower panel electrode including a lower panel unit electrodes; an upper panel electrode including an upper panel unit electrodes facing the lower panel unit electrodes; and a liquid crystal layer disposed between the lower panel electrode and the upper panel electrode, in which the lower panel unit electrode includes a stem portion which defines a boundary between a plurality of sub-regions therein, a center pattern disposed at a center of the stem portion and in which overlaps the sub-regions, and a plurality of micro branch portions which extends from the center pattern, where extending directions of the micro branch portions in different regions are different from each other, and an end portion of the micro branch portions is extended in a direction different from an extending direction thereof.

14 Claims, 25 Drawing Sheets

(56) References Cited

U.S. PATENT DOCUMENTS

| | | |
|---|---|---|
| 2010/0182557 A1 | 7/2010 | You et al. |
| 2012/0044446 A1* | 2/2012 | Hara ................. G02F 1/134309<br>349/139 |
| 2012/0249940 A1 | 10/2012 | Choi et al. |
| 2013/0003007 A1 | 1/2013 | Zhang |
| 2013/0101755 A1* | 4/2013 | Lee ................... G02F 1/133707<br>428/1.23 |
| 2014/0267994 A1 | 9/2014 | Ryu et al. |

* cited by examiner

LIQUID CRYSTAL DISPLAY

This application claims priority to Korean Patent Application No. 10-2013-0095582, filed on Aug. 12, 2013, and all the benefits accruing therefrom under 35 U.S.C. §119, the contents of which are incorporated by reference herein in its entirety.

BACKGROUND (a) Field

Exemplary embodiments of the invention relate to a liquid crystal display.

(b) Description of the Related Art

A liquid crystal display, which is one of the most widely used type of flat panel displays, typically includes two display panels on which electric field generating electrode, such as a pixel electrode and a common electrode, are disposed, and a liquid crystal layer interposed therebetween. The liquid crystal display displays an image by generating an electric field on a liquid crystal layer by applying a voltage to the electric field generating electrodes, determining alignments of liquid crystal molecules of the liquid crystal layer through the generated electric field, and controlling polarization of incident light.

A liquid crystal display with a vertically aligned mode in which long axes of liquid crystal molecules are arranged to be vertical to upper and lower display panels in a state where an electric field is not applied among the liquid crystal displays may have a high contrast ratio and a wide reference viewing angle.

In a vertical alignment mode liquid crystal display, a plurality of domains having different alignment directions of liquid crystal may be provided in each pixel to implement a wide viewing angle.

One example of a method of providing the plurality of domains is a method of forming a cutout, such as a slit, in an electric field generating electrode. In such a method, the liquid crystal is rearranged by a fringe field generated between an edge of the cutout portion and an electric field generating electrode facing the edge, such that the plurality of domains may be formed.

An example of the liquid crystal display including domains in each pixel thereof includes a vertical alignment ("VA") mode liquid crystal display including the domain forming element provided at both upper and lower substrates, and a patternless VA, in which a micro-pattern is formed at only a lower substrate, and a pattern is not formed at an upper substrate. In such a liquid crystal display, a display area is divided into a plurality of domains by the domain forming elements, and liquid crystal within each domain is substantially inclined in the same direction.

Recently, an initial alignment method, in which liquid crystal has pretilt in a state where an electric field is not applied, has been suggested to increase a response speed of liquid crystal while implementing a wide viewing angle. In the initial alignment method, an alignment layer in which alignment directions are plural is used, or an alignment supplement agent for making the liquid crystal to have the pretilt is added to the liquid crystal layer, an electric field is applied to the liquid crystal layer, and then the alignment supplement agent is hardened, to allow the liquid crystal to have the pretilt in various directions. The alignment supplement agent hardened by light, such as heat or ultraviolet rays, may allow the liquid crystal to have a pretilt in a specific direction. In the initial alignment method, a voltage is applied to each of the electric field generating electrodes to generate the electric field in the liquid crystal layer.

However, the alignment supplement agent, an ultraviolet ray hardening process, and the like are typically used to manufactured the liquid crystal display including the alignment supplement agent for the pretilt, such that a new process line is required and a manufacturing cost increases.

SUMMARY

Exemplary embodiments of the invention have been made in an effort to provide a liquid crystal display, which may be manufactured with a low manufacturing cost and a simple manufacturing process without additional manufacturing equipment of the liquid crystal display, and has high liquid crystal control and transmittance.

Further, exemplary embodiments of the invention have been made in an effort to provide a liquid crystal display, in which a display defect, such as bruising due to external pressure, is effectively prevented.

An exemplary embodiment of the invention provides a liquid crystal display including: a lower panel electrode including a lower panel unit electrodes; an upper panel electrode including an upper panel unit electrodes, which face the lower panel unit electrodes; and a liquid crystal layer disposed between the lower panel electrode and the upper panel electrode, in which the lower panel unit electrodes includes a stem portion which defines a boundary between a plurality of sub regions defined therein, a center pattern disposed at a center of the stem portion and in which overlaps the plurality of regions, and a plurality of micro branch portions which extends from the center pattern, where extending directions of the plurality of micro branch portions in different regions are different from each other, and an end portion of the plurality of micro branch portions is extended in a direction different from an extending direction thereof.

In an exemplary embodiment, the lower panel electrode may include a plurality of lower panel unit electrodes, and a width of a gap, which is a space between the adjacent lower panel unit electrodes, may not be uniform.

In an exemplary embodiment, an end portion of the plurality of micro branch portions corresponding to the border of the lower panel unit electrodes may be extended in a direction substantially parallel to the border.

In an exemplary embodiment, an end portion of the plurality of micro branch portion corresponding to the border of the lower panel unit electrodes may be extended further than an end portion of the plurality of micro branch portions corresponding to a side of the lower panel unit electrode.

In an exemplary embodiment, a corner of the lower panel unit electrode may be chamfered.

In an exemplary embodiment, the width of the gap may be increased as being closer to the corner of the lower panel unit electrode.

In an exemplary embodiment, the lower panel electrode may include a plurality of lower panel unit electrodes, and the lower panel electrode may further includes a first connection portion which is connects the plurality of lower panel unit electrodes to each other.

In an exemplary embodiment, the liquid crystal display may further include a pixel including a first subpixel and a second which are configured to output an input image signal with substantially a same luminance as each other or different luminances from each other, the first subpixel and the second subpixel may include the lower panel electrode and the upper panel electrode, respectively, and the number of the lower panel unit electrodes in the second subpixel may be greater than the number of the lower panel unit electrodes in the first subpixel.

In an exemplary embodiment, the liquid crystal display may further include: a first connection portion configured to connect adjacent lower panel unit electrodes in a horizontal direction to each other; and a second connection portion configured to connect adjacent lower panel unit electrodes in a vertical direction to each other.

In an exemplary embodiment, an angle between the plurality of micro branch portions and a horizontal direction may be less than about 45 degrees.

In an exemplary embodiment, the liquid crystal layer may not include a hardened alignment supplement agent which allows the liquid crystal layer to have a pretilt angle.

In an exemplary embodiment, an opening may be defined in the upper panel unit electrode, and the opening faces the stem portion and extends along the stem portion.

In an exemplary embodiment, the opening may have a cross-like shape.

In an exemplary embodiment, the liquid crystal display may further include: a first insulating substrate; a gate line disposed on the first insulating substrate; a data line disposed on the first insulating substrate, where the data line crosses the gate line and insulated from the gate line; and a color filter disposed on the gate line and the data line.

In an exemplary embodiment, the liquid crystal display may further include a thin film transistor connected to the gate line and the data line.

In an exemplary embodiment, the lower panel electrode may be disposed on the color filter, and the lower panel electrode may include a first subpixel electrode and a second subpixel electrode, which are spaced apart from each other with the gate line interposing therebetween.

In an exemplary embodiment, the liquid crystal display may further include a first thin film transistor connected to the gate line and the data line and the first subpixel electrode, and a second thin film transistor connected to the gate line and the data line and the second subpixel electrode.

According to exemplary embodiments of the invention, a liquid crystal display may be manufactured with a low manufacturing cost and a simple manufacturing process without additional manufacturing equipment of the liquid crystal display, and has high liquid crystal control and transmittance.

In such embodiments, a display defect, such as bruising, according to external pressure is effectively prevented.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
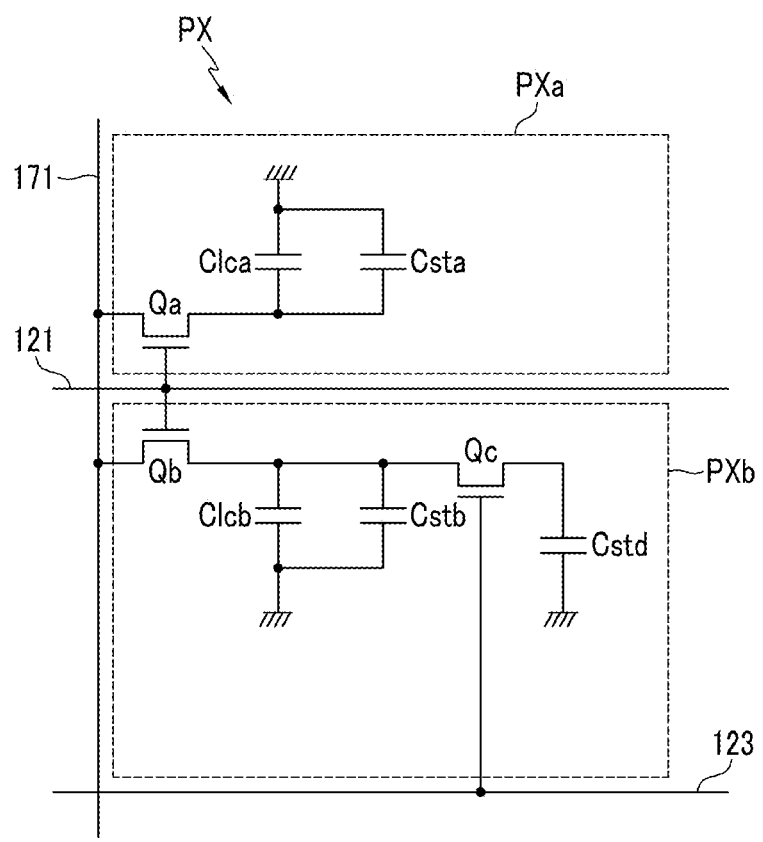
FIG. 1 is an equivalent circuit diagram of one pixel of a liquid crystal display, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of a liquid crystal display, according to the invention, will be described with reference to FIGS. 1 to 4.

Figure 2:
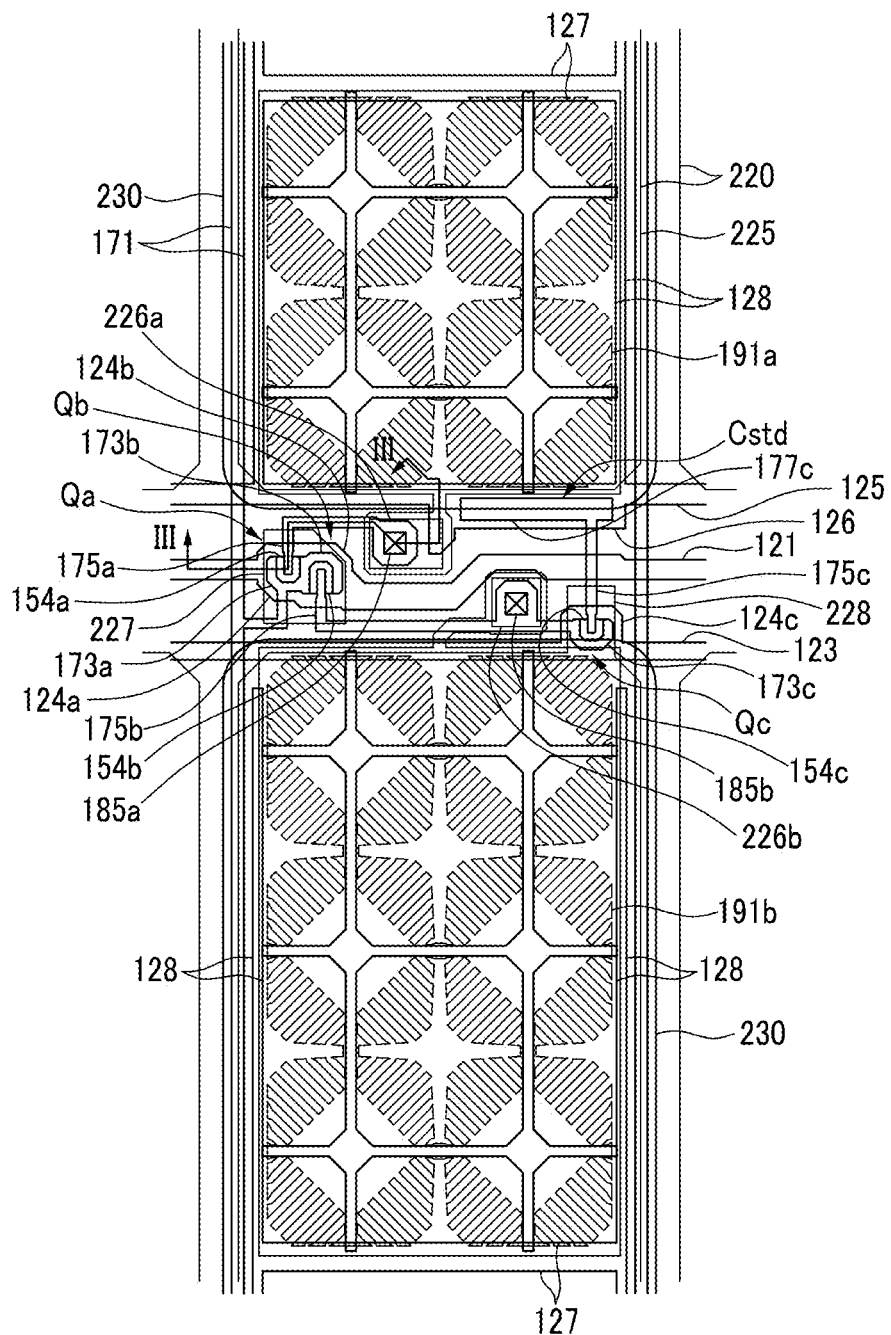
FIG. 2 is a top plan view of a pixel of an exemplary embodiment of a liquid crystal display, according to the invention.
Figure 3:
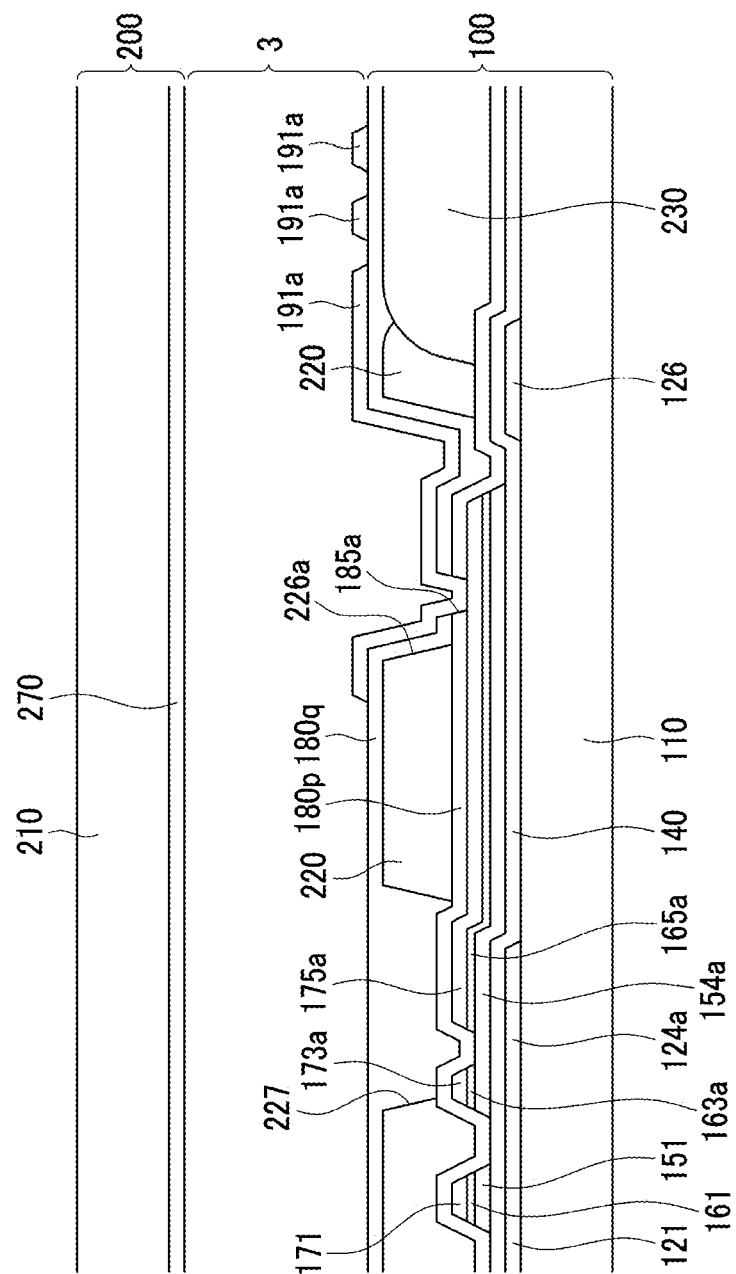
FIG. 3 is a cross-sectional view taken along line II-II of the liquid crystal display of FIG. 1.
Figure 4:
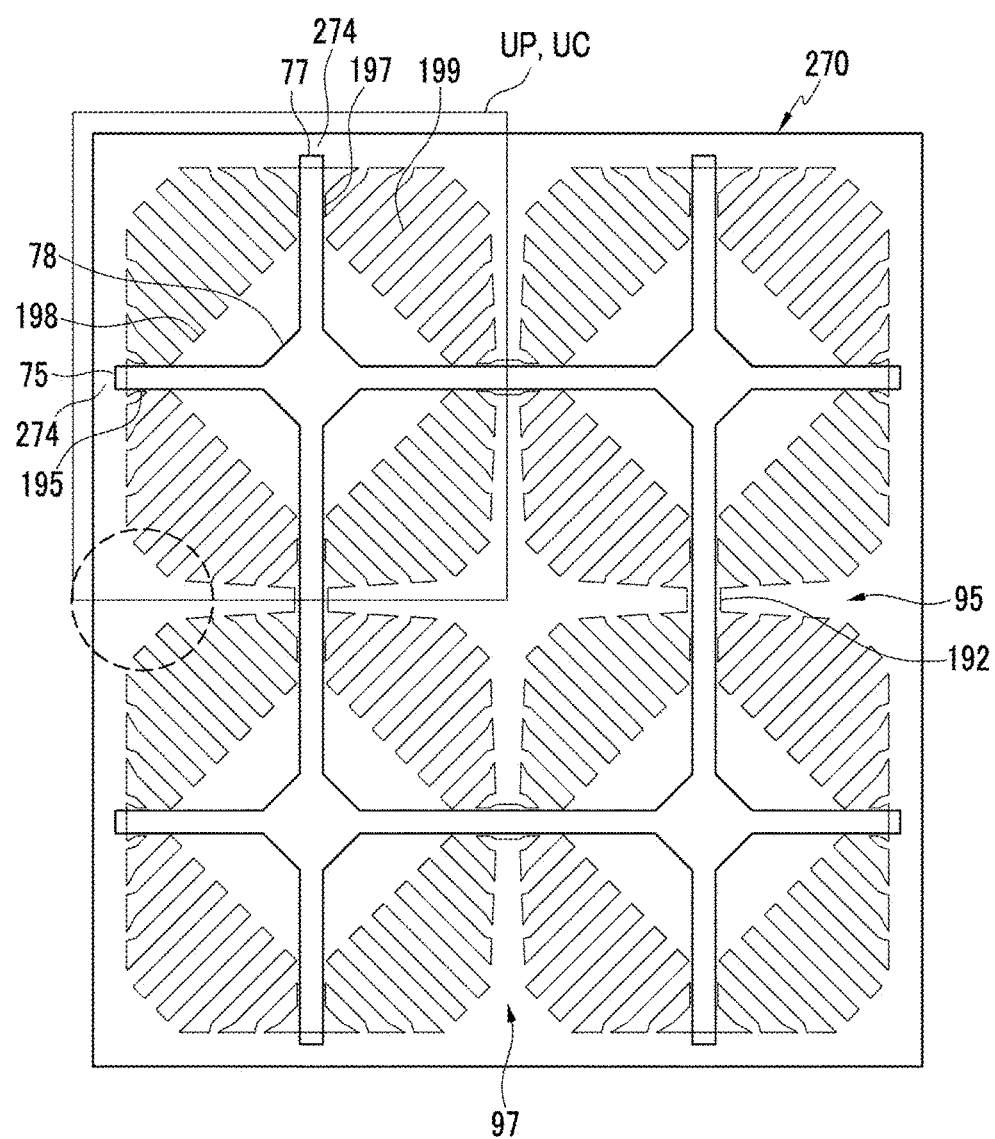
FIG. 4 is a top plan view illustrating a lower panel electrode and an upper panel electrode of an exemplary embodiment of the liquid crystal display, according to the invention.

FIG. 1 is an equivalent circuit diagram of a pixel of an exemplary embodiment of a liquid crystal display, according to the invention, FIG. 2 is a top plan view of an exemplary embodiment of a liquid crystal display, according to the invention, FIG. 3 is a cross-sectional view taken along line II-II of the liquid crystal display of FIG. 1, and FIG. 4 is a top plan view illustrating a lower panel electrode and an upper panel electrode of an exemplary embodiment of the liquid crystal display, according to the invention.

Referring to FIG. 1, an exemplary embodiment of the liquid crystal display, according to the invention, includes signal lines including a gate line 121, a step-down gate line 123 and a data line 171, and a pixel PX connected to the signal lines.

The pixel PX includes first and second subpixels PXa and PXb. The first subpixel PXa includes a first switching element Qa, a first liquid crystal capacitor Clca and a first storage capacitor Csta, and the second subpixel PXb includes second and third switching elements Qb and Qc, a second liquid crystal capacitor Clcb, a second storage capacitor Cstb and a step-down capacitor Cstd.

Each of the first and second switching elements Qa and Qb are connected to the gate line 121 and the data line 171, and the third switching element Qc is connected to the step-down gate line 123.

The first and second switching elements Qa and Qb may be three terminal elements, such as thin film transistors, and control terminals thereof are connected to the gate line 121, input terminals thereof are connected to the data line 171, and output terminals thereof are connected to the first and second liquid crystal capacitors Clca and Clcb, respectively, and the first and second storage capacitors Csta and Cstb, respectively.

The third switching element Qc may be a three terminal element, such as a thin film transistor, and a control terminal thereof is connected to the step-down gate line 123, an input terminal thereof is connected to the second liquid crystal capacitor Clcb, and an output terminal thereof is connected to the step-down capacitor Cstd.

The step-down capacitor Cstd is connected to the output terminal of the third switching element Qc and a common voltage.

Hereinafter, an operation of the pixel PX will be described. First, when a gate-on voltage is applied to the gate line 121, the first and second thin film transistors Qa and Qb connected to the gate line 121 are turned on. Accordingly, the data voltage of the data line 171 is applied to the first and second liquid crystal capacitors Clca and Clcb through the turned-on first and second switching elements Qa and Qb, such that the first and second liquid crystal capacitors Clca and Clcb are charged with a voltage corresponding to a difference between the data voltage and the common voltage. When the gate-on voltage is applied to the gate line 121, a gate-off voltage is applied to the step-down gate line 123.

Next, when the gate-off voltage is applied to the gate line 121 and the gate-on voltage Von is simultaneously applied to the step-down gate line 123, the first and second switching elements Qa and Qb are turned off, and the third switching element Qc is turned off. Accordingly, a charging voltage of the second liquid crystal capacitor Clcb connected to the output terminal of the second switching element Qb is dropped. Accordingly, in an exemplary embodiment, where the liquid crystal display driven by a frame inversion, the charging voltage of the second liquid crystal capacitor Clcb is substantially constantly lower than a charging voltage of the first liquid crystal capacitor Clca such that side visibility of the liquid crystal display is substantially improved by differentiating the charge voltages of the first and second liquid crystal capacitors Clca and Clcb.

Then, an exemplary embodiment of the liquid crystal display having the circuit structure illustrated in FIG. 1 will be described with reference to FIGS. 2 and 3. The same or like elements shown in FIGS. 2 and 3 have been labeled with the same reference characters as used above to describe the exemplary embodiments of the liquid crystal display in FIG. 1, and any repetitive detailed description thereof will hereinafter be omitted or simplified.

FIG. 2 is a top plan view of a pixel of an exemplary embodiment of the liquid crystal display, according to the invention, and FIG. 3 is a cross-sectional view taken along line II-II of the liquid crystal display of FIG. 2.

An exemplary embodiment of the liquid crystal display, according to the invention, includes two display panels facing each other, e.g., a lower display panel 100 and an upper display panel 200, and a liquid crystal layer 3 interposed between the two display panels 100 and 200.

First, the lower display panel 100 will be described. In the lower display panel 100, a plurality of gate conductors including the gate line 121, the step-down gate line 123 and the storage electrode line 125 is disposed on an insulating substrate 110. The gate line 121 and the step-down gate line 123 extend substantially in a first direction, e.g., a horizontal direction, and transmit a gate signal. The gate line 121 may include a first gate electrode 124a and a second gate electrode 124b, and the step-down gate line 123 may include a third gate electrode 124c. The first gate electrode 124a and the second gate electrode 124b are connected to each other. The storage electrode line 125 may extend substantially in the first direction, and transmits a predetermined voltage, such as the common voltage Vcom. The storage electrode line 125 may include a storage extension portion 126, a pair of vertical portions 128 that upwardly extended to be substantially vertical to the gate line 121, and a horizontal portion 127 that connects the pair of vertical portions 128, but a structure of the storage electrode line 125 is not limited thereto.

A gate insulating layer 140 is disposed on the gate conductors, and a semiconductor 151 is disposed on the gate insulating layer 140. The semiconductor 151 may extend substantially in a second direction that is substantially vertical to the first direction, e.g., a vertical direction, and include first and second semiconductors 154a and 154b that extend toward the first and second gate electrodes 124a and 124b and are connected to each other, and a third semiconductor 154c connected to the second semiconductor 154b.

A plurality of ohmic contacts 161 is disposed on the semiconductor 151. In an exemplary embodiment, ohmic contacts 163a and 165a are disposed on the first semiconductor 154a, the second semiconductor 154b and the third semiconductor 154c. In an alternative exemplary embodiment, some of the ohmic contacts 161, e.g., the ohmic contact 165a disposed on the first semiconductor 154a, may be omitted.

The data conductor including the data line 171, the first drain electrode 175a, the second drain electrode 175b and the third drain electrode 175c are disposed on the ohmic contacts 161. The data line 171 may include a first source electrode 173a and a second source electrode 173b that extend toward the first gate electrode 124a and the second gate electrode 124b, respectively. Rod-shaped end portions of the first drain electrode 175a and the second drain electrode 175b are partially surrounded by the first source electrode 173a and the second source electrode 173b, respectively. One wide end of the second drain electrode 175b is further extends and bent in a U-shape, thereby defining a third source electrode 173c. A wide end portion 177c of the third drain electrode 175c overlaps the storage extension portion 126, and thereby forms the step-down capacitor Cstd, and a rod-shaped end portion of the third drain electrode 175c is partially surrounded by the third source electrode 173c.

The first, second and third gate electrodes 124a, 124b and 124c, the first, second, and third source electrodes 173a, 173b and 173c, and the first, second, and third drain electrodes 175a, 175b and 175c collectively define the first, second and third thin film transistors Qa, Qb and Qc, respectively, together with the first, second and third semiconductors 154a, 154b and 154c, respectively.

A lower passivation layer 180p is disposed on the data conductors 171, 175a, 175b and 175c and exposed portions of the semiconductors 154a, 154b and 154c, and a color filter 230 and a light blocking member 220 may be disposed on the lower passivation layer 180p. An opening 227 defined on the first thin film transistor Qa and the second thin film transistor Qb, an opening 226a defined on the wide end portion of the first drain electrode 175a, an opening 226b defined on the wide end portion of the second drain electrode 175b, and an opening 228 defined on the third thin film transistor Qc. In an alternative exemplary embodiment, at least one of the color filter 230 and the light blocking member 220 may be disposed in the upper display panel 200.

An upper passivation layer 180q is disposed on the color filter 230 and the light blocking member 220. A plurality of contact holes 185a and 185b, through which the first drain electrode 175a and the second drain electrode 175b are exposed, respectively, is defined in the lower passivation layer 180p and the upper passivation layer 180q.

A lower panel electrode including a first subpixel electrode 191a and a second subpixel electrode 191b is disposed on the upper passivation layer 180q. Each of the first subpixel electrode 191a and the second subpixel electrode 191b may have a predetermined shape, e.g., a shape shown in FIG. 4, which will be described later in greater detail. In an exemplary embodiment, where an area of the first subpixel electrode 191a is different from an area of the second subpixel electrode 191b to improve side visibility, the first subpixel electrode 191a may include four lower panel unit electrodes UP as illustrated in the lower panel electrode 191 illustrated in FIG. 2, and the second subpixel electrode 191b may include six or eight lower panel unit electrodes UP. FIG. 2 illustrates an exemplary embodiment, where the first subpixel electrode 191a includes four lower panel unit electrodes UP, and the second subpixel electrode 191b includes six lower panel unit electrodes UP. Hereinafter, an exemplary embodiment, in which a distal end of each micro branch portion of the sub-pixel electrodes is expanded or extends in a direction different from the extending direction thereof, will be described.

In an exemplary embodiment, a micro branch portion of the sub-pixel electrodes is expanded or extend in a direction different from the extending direction thereof, such that liquid crystal control is improved, texture is decreased, and transmittance and a response speed are improved. In such an embodiment, the liquid crystal display includes the micro branch portion, in which the region corresponding to the border of the subpixel electrode and the region not-corresponding to the border of the subpixel electrode are asymmetrically expanded or extends in a direction different from the extending direction thereof such that performance, such as liquid crystal control, is substantially effectively performed.

The first subpixel electrode 191a receives a data voltage from the first drain electrode 175a through the contact hole 185a, and the second subpixel electrode 191b may receive a data voltage from the second drain electrode 175b through the contact hole 185b.

Next, the upper display panel 200 will be described. In the upper display panel 200, the upper panel electrode 270 is positioned on an insulating substrate 210. The upper panel electrode 270 of each subpixel PXa and PXb may have substantially a same structure as the upper panel electrode illustrated in FIG. 4. In an exemplary embodiment, where an area of the second subpixel PXb is different from, e.g., greater than or less than, an area of the first subpixel PXa to improve side visibility, the upper panel electrode 270 of the first subpixel PXa may include four upper panel unit electrodes UC, and the upper panel electrode 270 of the second subpixel PXb may include six or eight upper panel unit electrodes UC. In an exemplary embodiment shown in FIG. 2, the upper panel electrode 270 of the first subpixel PXa includes four upper panel unit electrodes UC, and the upper panel electrode 270 of the second subpixel PXb includes six upper panel unit electrodes UC. In such an embodiment, a distal end of the micro branch portion of each unit electrode is expanded or extends in a direction different from the extending direction thereof.

In an exemplary embodiment, where a distal end of a micro branch portion is expanded or extends in a direction different from the extending direction thereof, liquid crystal control is improved, texture is decreased, and transmittance and a response speed are improved. In such an embodiment, where the micro branch region corresponding to the border of the pixel electrode and the region not-corresponding to the border of the pixel electrode are asymmetrically extended, e.g., having different shape or width, performance is more effectively performed in a case.

The first subpixel electrode 191a and the upper panel electrode 270 define the first liquid crystal capacitor Clca together with the liquid crystal layer 3 interposed therebetween, the second subpixel electrode 191b and the upper panel electrode 270 define the second liquid crystal capacitor Clcb together with the liquid crystal layer 3 interposed therebetween, such that the applied voltage is maintained even though the first and second thin film transistors Qa and Qb are turned off. In such an embodiment, the first and second subpixel electrodes 191a and 191b may overlap the storage electrode line 125 to define the first and second storage capacitors Csta and Cstb.

In an exemplary embodiment of the liquid crystal display may include any liquid crystal display in which the lower panel electrode 191 for one pixel PX includes a plurality of lower panel unit electrodes UP, and the upper panel electrode 270 for one pixel PX includes a plurality of upper panel unit electrodes UC. The number of lower panel unit electrodes UP or upper panel unit electrodes UC included in one pixel PX may vary based on a liquid crystal control according to the structure and the area of the pixel PX. Here, an exemplary embodiment, where the four lower panel unit electrodes UP connected to each other and the four upper panel unit electrodes UC connected to each other will be described in detail for convenience of description, but the invention is not limited thereto.

Referring to FIG. 4, the plurality of lower panel unit electrodes UP are connected to each other through the connection portion 192. The connection portion 192 may be positioned on an extended line of cross-shaped stem portions 195 and 197 of the lower panel unit electrode UP. A space between the lower panel unit electrodes UP adjacent in the second direction, that is, the vertical direction, defines a horizontal gap 95, and a space between the lower panel unit electrodes UP adjacent in the first direction, that is, the horizontal direction, defines a vertical gap 97.

The plurality of upper panel unit electrodes UC is connected to each other. Cross-shaped openings 75 and 77 (e.g., openings having a cross-like shape) of the upper panel unit electrodes UC adjacent in the first direction or the second direction may be connected to each other. In such an embodiment, end portions of the cross-shaped openings 75 and 77 adjacent to a side of the upper panel electrode 270 may be spaced apart from the side of the upper panel electrode 270 to form a connection portion 274. That is, four sub regions divided by the cross-shaped openings 75 and 77 in each upper panel unit electrode UC may be connected to each other through the connection portion 274.

The liquid crystals positioned in the region of the horizontal gap 95 or the vertical gap 97, which is a space between the adjacent lower panel unit electrodes UP, may not have a uniform inclination direction, and may be inclined in both directions substantially parallel to the extending direction of the horizontal gap 95 or the vertical gap 97. Accordingly, the liquid crystals in the region of the horizontal gap 95 or the vertical gap 97 are controlled in a different direction from the liquid crystals in the sub region in which the micro branch portion 199 of the lower panel electrode 191 is disposed. In such an embodiment, when pressure is applied to the display panel of the liquid crystal display displaying an image from the outside, the arrangement directions of the liquid crystals around the horizontal gap 95 or the vertical gap 97, which are in disorder or not in uniformly arranged, may collide with each other, such that texture may be generated, and the texture may be viewed as bruising when the directions of the liquid crystals around the horizontal gap 95 or the vertical gap 97 are not restored even though the external pressure is removed. In such an embodiment, the arrangement of the liquid crystals around the horizontal gap 95 or the vertical gap 97 influences the liquid crystals therearound by the external pressure, such that disorder of the arrangement of the liquid crystals may occur in the liquid crystals in an area around the horizontal gap 95 or the vertical gap 97. Accordingly, the texture is spread, and the spread texture may be viewed as bruising even after the external pressure is removed. The bruising may be substantially severe when the display image has a high grayscale.

In an exemplary embodiment, where the lower panel electrode has a shape illustrated in FIG. 4, the generation of the bruising due to the texture left even after the external pressure is removed, is effectively prevented or the bruising is rapidly removed.

Referring again to FIG. 4, in an exemplary embodiment, the lower panel electrode 191 for one pixel PX includes a center pattern 198 positioned at a center portion of the cross-shaped stem portions 195 and 197 of each lower panel unit electrode UP. In one exemplary embodiment, for example, the center pattern 198 has a rhombus shape, and each edge side may have an oblique angle with respect to the extending directions of the cross-shaped stem portions 195 and 197. In such an embodiment, a direction of the edge side of the center pattern 198 and a direction, in which the micro branch portion 199 is extended, may form an angle of about a right angle or about 90 degrees.

As described above, in an exemplary embodiment, where the center pattern 198 is provided at a center portion of the cross-shaped stem portions 195 and 197 of each lower panel unit electrode UP, a fringe field generated by the edge side of the center pattern 198 influences to the area around the horizontal gap 95 or the vertical gap 97, thereby substantially improving liquid crystal control. Accordingly, in such an embodiment, the generation of the bruising due to the texture may be effectively removed or suppressed, even after the external pressure is removed.

In an exemplary embodiment, a length of the micro branch portion 199 of the lower panel unit electrode UP is short, a liquid crystal control by the fringe field formed by the end portion of the micro branch portion 199 and a liquid crystal control at the area around the horizontal gap 95 or the vertical gap 97 may be improved. In such an embodiment, as a size of the center pattern 198 is increased in the lower panel unit electrode UP, an area of which is predetermined or limited, the length of the micro branch portion 199 becomes shorter, and the effect of the center pattern 198 is there greater than an effect of the micro branch portion 199 at the area around the horizontal gap 95 or the vertical gap 97, thereby further decreasing the generation of the bruising due to the external pressure.

In an exemplary embodiment, the upper panel electrode 270 of a pixel PX may include a center opening 78 defined at the center portion of the cross-shaped openings 75 and 77 of each upper panel unit electrode UC. In one exemplary embodiment, for example, the center opening 78 has a rhombus shape, and each side edge of the center opening 78 may have an oblique angle with respect to the extending direction of the cross-shaped stem portions 195 and 197. In such an embodiment, a direction of the edge side of the center opening 78 and a direction, in which the micro branch portion 199 is extended, may form an angel of about a right angle or about 90 degrees.

In an exemplary embodiment, as described above, the center opening 78 is defined in the upper panel electrode 270, and the fringe field by the edge side of the center opening 78 influences to the area around the horizontal gap 95 or the vertical gap 97, thereby substantially improving the liquid crystal control. Accordingly, the generation of the bruising due to the texture even after the external pressure is removed is effectively removed or suppressed.

In an exemplary embodiment, a portion of four corner portions of each lower panel unit electrode UP may be chamfered as shown by the dotted circle in FIG. 4. In one exemplary embodiment, for example, the four corners of the each lower panel unit electrode UP may be chamfered as shown in FIG. 4. In an alternative exemplary embodiment, a center portion of the lower panel electrode 191, that is, a corner of each lower panel unit electrode UP positioned at a center portion, at which the four lower panel unit electrodes UP are disposed adjacent to each other, may not be chamfered.

A length of the chamfered corner may be in a range of about 10 micrometers (μm) to about 15 μm, but not being limited thereto.

In an exemplary embodiment, where the corner portion of the lower panel unit electrode UP is chamfered as described above, the end portion of the micro branch portion 199 is cut, such that the length of a relatively long micro branch portion among the micro branch portions 199 may be decreased. Accordingly, the influence of the fringe field by the end portion of the shortened micro branch portion 199 as described above is substantially effectively transferred to the area around the horizontal gap 95 or the vertical gap 97, thereby improving liquid crystal control. In such an embodiment, the end portion of the micro branch portion 199 at the chamfered corner has substantially the oblique angle with the horizontal stem portion 195 or the vertical stem portion 197, thereby improving liquid crystal control in a direction substantially parallel to the extension direction of the micro branch portion 199. Accordingly, in such an embodiment, the bruising due to the external pressure is effectively prevented or rapidly removed.

In an exemplary embodiment, a shape of the horizontal gap 95 or the vertical gap 97 of the lower panel electrode 191 may be substantially inconstant or non-uniform. According to an exemplary embodiment, an edge of the horizontal gap 95 or the vertical gap 97 is not parallel but is oblique to the horizontal direction or the vertical direction, to form an oblique angle. In such an embodiment, a width (e.g., a length in a direction substantially perpendicular to an extending direction) of the horizontal gap 95 or the vertical gap 97 is not uniform, and may vary depending on a position.

In one exemplary embodiment, for example, a width of the horizontal gap 95 or the vertical gap 97 may be smallest at an area around the connection portion 192, and the width thereof may be increased as the horizontal gap 95 or the vertical gap 97 moves away from the connection portion 192. That is, the width of the horizontal gap 95 or the vertical gap 97 may be decreased as being closer to the cross-shaped stem portions 195 and 197, and the width thereof may be increased as being closer to the corner of the lower panel unit electrode UP. Accordingly, the width of the horizontal gap 95 or the vertical gap 97 may be maximum at the center portion of the lower panel electrode 191, that is, the center portion at which the four lower panel unit electrodes UP are disposed adjacent to each other, or the corner portion of the lower panel unit electrode UP. In such an embodiment, the width of the horizontal gap 95 or the vertical gap 97 may be maximum at the area around the edge of the lower panel electrode 191.

As described above, when the edges or sides of the horizontal gap 95 or the vertical gap 97 of the lower panel electrode 191 is not uniform or not substantially parallel to each other, the liquid crystals positioned at the region of the horizontal gap 95 or the vertical gap 97 may be inclined in the direction, which is not parallel to the horizontal direction or the vertical direction. Accordingly, the liquid crystal at the area around the horizontal gap 95 or the vertical gap 97 are controlled and inclined to a direction substantially close to the extending direction of the adjacent micro branch portion 199, thereby decreasing texture around the horizontal gap 95 or the vertical gap 97. Accordingly, the generation of the bruising may be effectively prevented or the bruising, left after the external pressure is applied and then the pressure is removed, may be rapidly removed.

Further, according to an exemplary embodiment of the invention, the end portion (e.g., the distal end portion) of the micro branch portion of the lower panel electrode 191 is expanded or extended in a direction along a side of the lower panel electrode 191. As shown in the micro branch portion of FIG. 4, a width of the end portion of the micro branch portion is not constant, and the micro branch portion is extended to both opposing directions along the side at the end portion. In such an embodiment, the micro branch portion of the lower panel electrode is uniformly expanded to the both opposing directions along a side thereof, but not being limited thereto. In an alternative exemplary embodiment, the micro branch portion of the lower panel electrode may be extended to one of the both opposing directions at the side. In such an embodiment, the texture is decreased through the expanded micro branch portion, and transmittance is substantially improved through a partial extension of the lower panel electrode 191.

A degree of the extension may be determined based on the width of the micro branch portion. In one exemplary embodiment, for example, the width of the micro branch portion is in a range of about 0.3 μm to about 1.2 μm, or may be in a range of about 0.5 μm to about 1.0 μm.

In an exemplary embodiment, only some of the plurality of micro branch portions may be extended. In one exemplary embodiment, for example, a micro branch portion chamfered while having 45 degrees with the horizontal stem portion, a region near which the generation of the texture is slight, may not be extended.

Degrees of the extension of the extended micro branch portions may be different from each other. In an exemplary embodiment, all of the micro branch portions are not equally extended. In one exemplary embodiment, for example, the micro branch portion corresponding to the border of each pixel may be extended greater than the micro branch portion which does not correspond to the border of each pixel. As described above, in an exemplary embodiment, the micro branch portion is not uniformly extended, and liquid crystal control and an oblique line bruising removal effect are further improved.

In an exemplary embodiment, the lower panel electrode may have various shapes including the aforementioned configuration. Hereinafter, an exemplary embodiment and a comparative embodiment will be described with reference to FIGS. 5A and 5C.

Figure 5A:
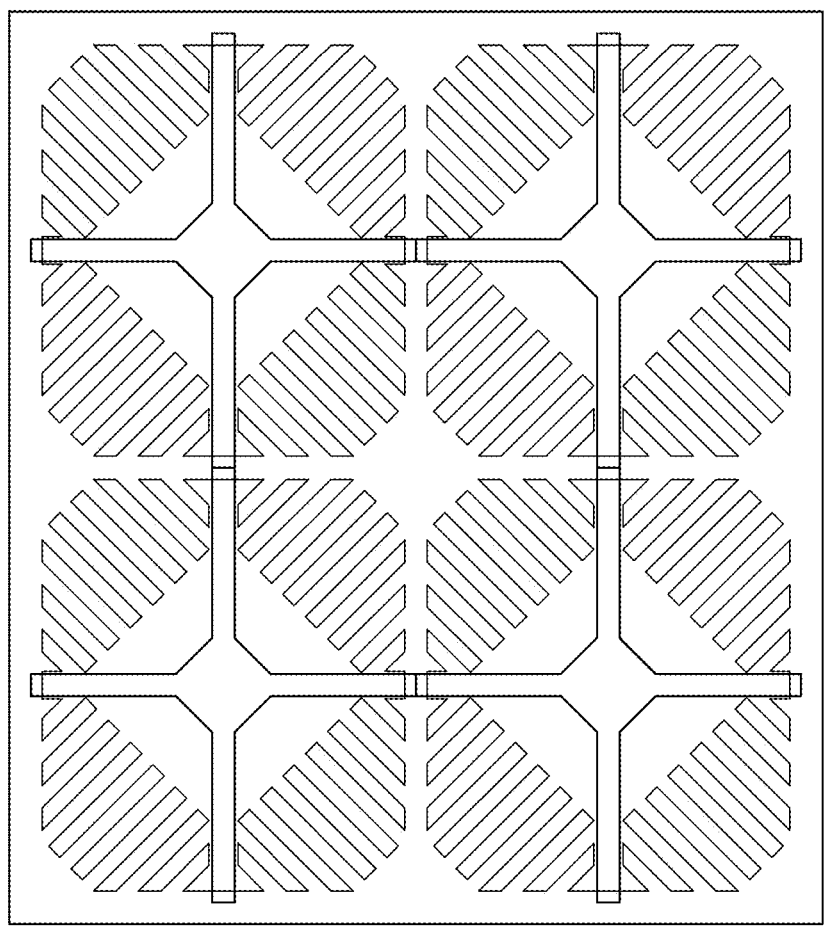
FIGS. 5A to 5C are top plan views illustrating exemplary embodiments of the invention and a comparative embodiment.
Figure 5B:
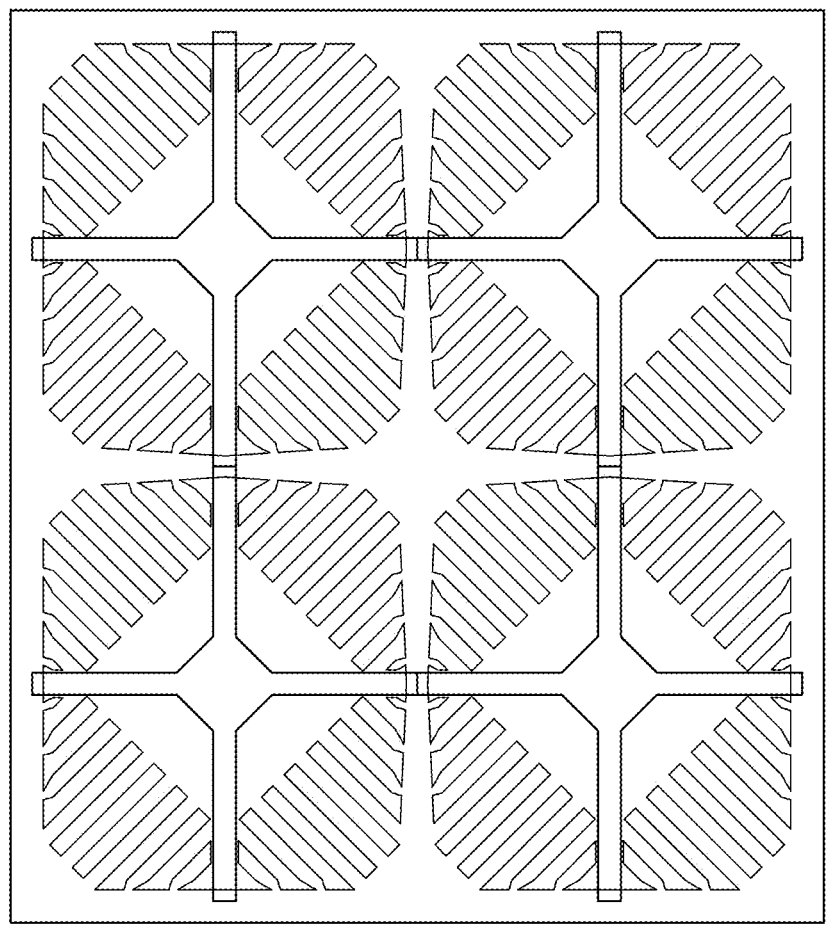
Figure 5C:
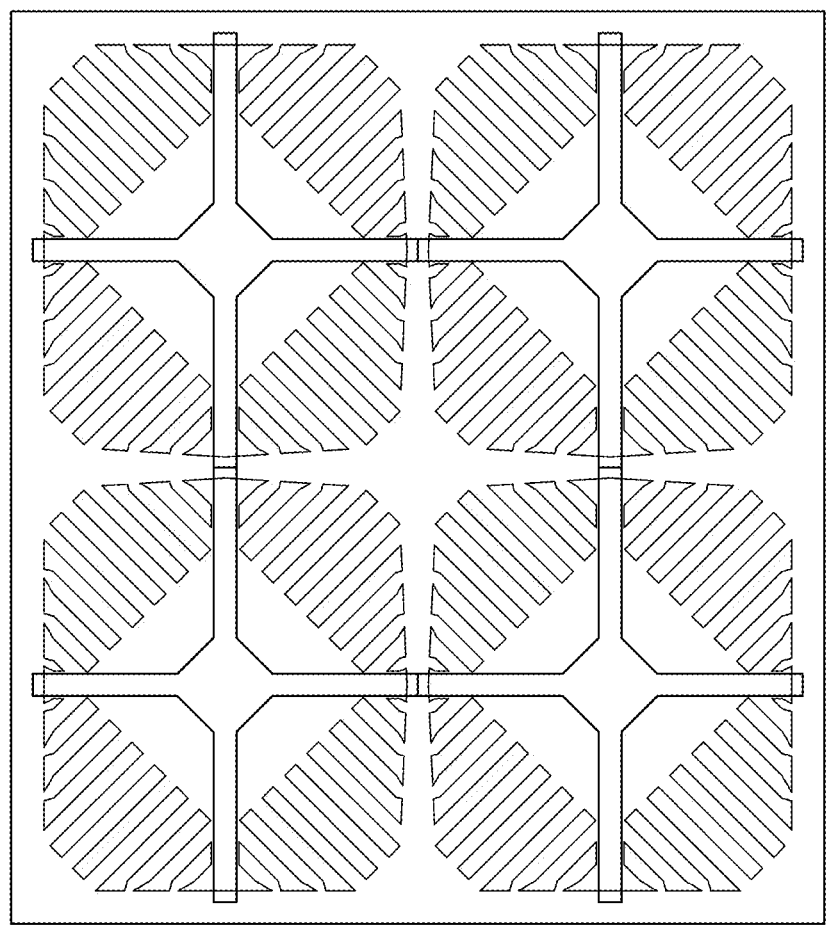

FIG. 5A is a plan view showing a comparative embodiment, in which the lower panel electrode includes a chamfered shape and a width of the gap between the lower panel unit electrodes is uniform, FIG. 5B is a plan view showing an exemplary embodiment, in which the lower panel electrode includes a chamfered shape, a width of the gap between the lower panel unit electrodes is not uniform, and a degree of extension of the micro branch portion is uniform, and FIG. 5C is a plan view showing another exemplary embodiment, in which a lower panel electrode includes a chamfered shape, a width of a gap between the lower panel unit electrodes is not uniform, and a degree of extension of the micro branch portion is not uniform. In the exemplary embodiment shown in FIG. 5C, a degree of extension of the micro branch portion positioned at an outer side is greater than a degree of extension of the micro branch portion positioned at an internal side. In FIGS. 5A to 5C merely show a few exemplary embodiment of the invention, and the invention is not limited, and may have any combination of the aforementioned configurations.

Figure 6A:
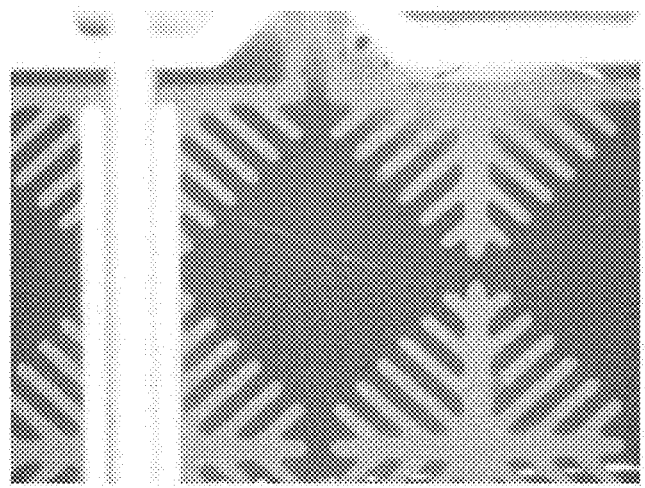
FIGS. 6A to 6C are scanning electron microscope ("SEM") images of first subpixels including micro branch portions having different degrees of extension.
Figure 6B:
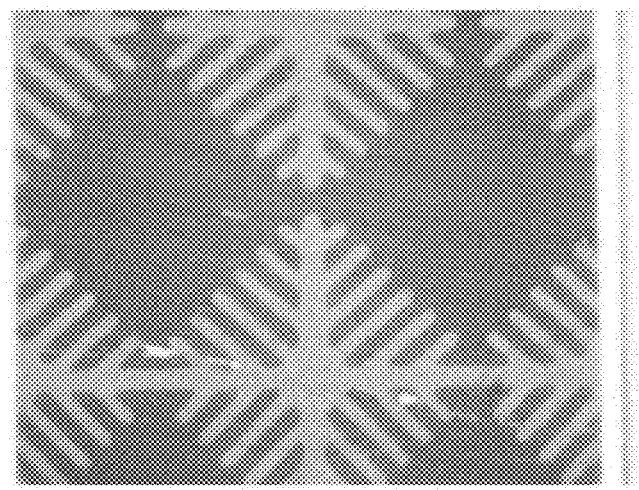
Figure 6C:
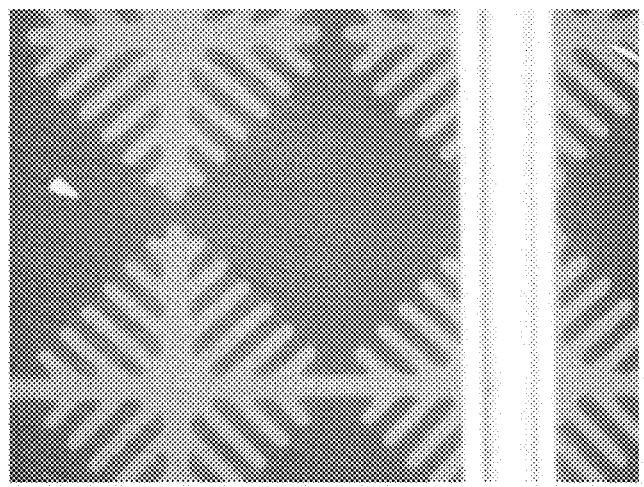
Figure 7A:
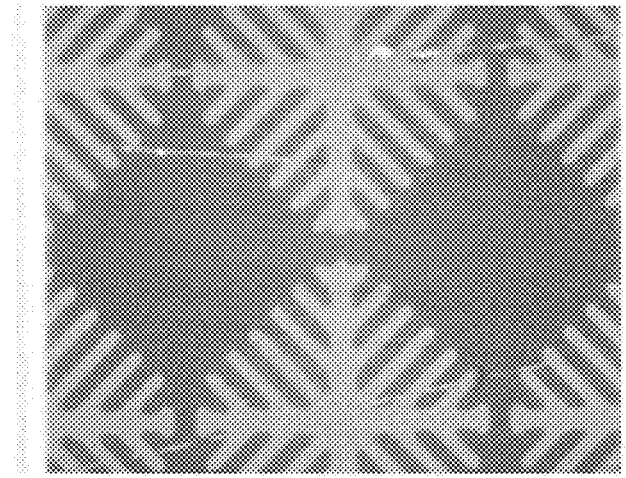
FIGS. 7A to 7C are SEM images of second subpixels including micro branch portions having different degrees of extension.
Figure 7B:
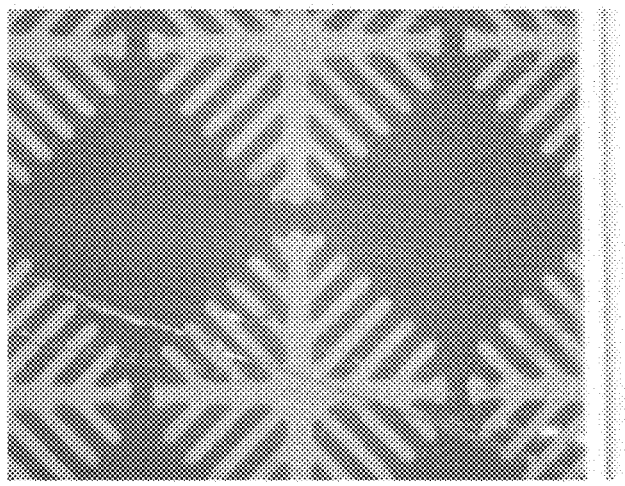
Figure 7C:
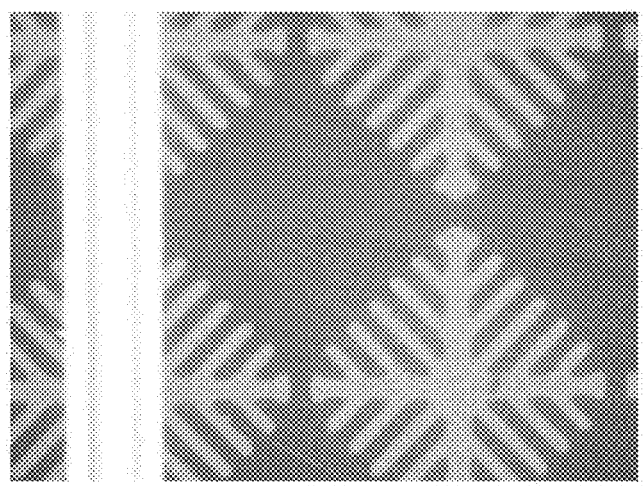
Figure 8A:
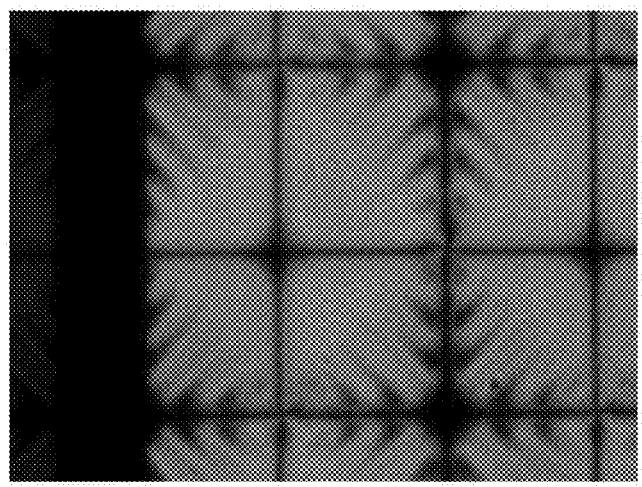
FIGS. 8A to 8C are images showing transmittance of the second subpixels including micro branch portions having different degrees of extension.
Figure 8B:
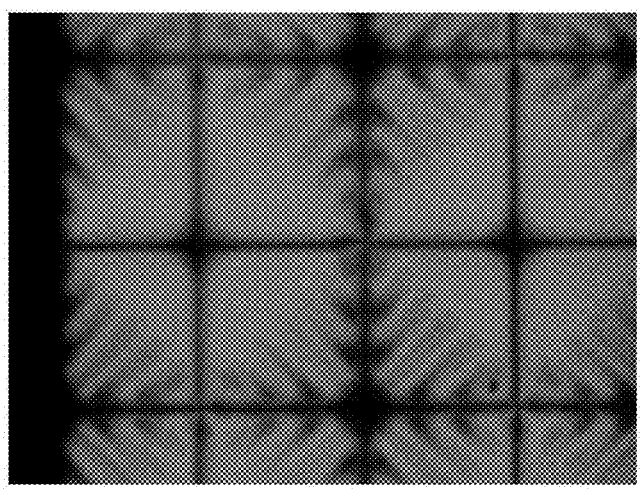
Figure 8C:
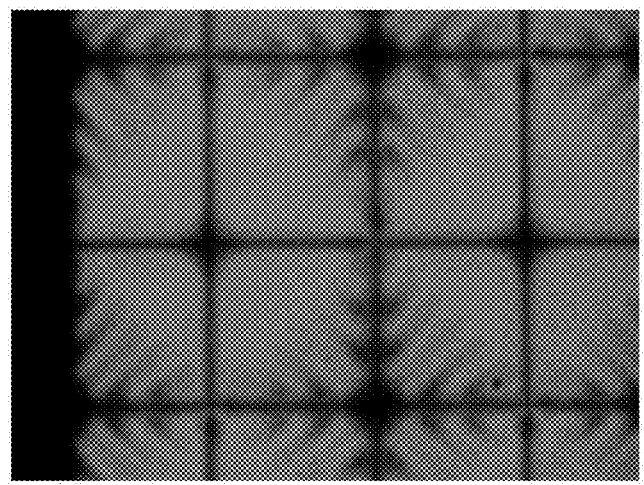

FIGS. 6A to 6C are scanning electron microscope ("SEM") images of first subpixels including micro branch portions having different degrees of extension, FIGS. 7A to 7C are SEM images of second subpixels including micro branch portions having different degrees of extension, and FIGS. 8A to 8C are images showing transmittance of the second subpixels including the micro branch portions having different degrees of extension.

Particularly, FIGS. 6A and 7A show an comparative embodiment in which the micro branch portions of the first subpixel and the second subpixel are not extended, FIGS. 6B and 7B show an exemplary embodiment in which all of the micro branch portions of the first subpixel and the second subpixel are extended, and FIGS. 6C and 7C show another exemplary embodiment in which the micro branch portions of the first subpixel are not extended and only the micro branch portions of the second subpixel are extended.

In each of the embodiments shown in the SEM images of FIGS. 6A to 7C, when the end portion of the micro branch portion of the first subpixel is expanded, transmittance is improved in an embodiment where the micro branch portions are extended, as illustrated in FIGS. 6B, 7B and 7C.

FIG. 8A is an image showing transmittance of the second subpixel electrode of an embodiment in which the micro branch portions of the first subpixel electrode and the second subpixel electrode are not extended, FIG. 8B is an image showing transmittance of the second subpixel electrode of an embodiment in which all of the micro branch portions of the first subpixel electrode and the second subpixel electrode are extended, and FIG. 8C is an image of transmittance of the second subpixel electrode of an embodiment in which the micro branch portion of the first subpixel electrode is not extended and only the micro branch portion of the second subpixel electrode is extended.

As shown in FIGS. 8A to 8C, a generation of texture is decreased in the embodiments shown in FIGS. 8B and 8C where the micro branch portion are extended, compared to the embodiment shown in FIG. 8A where the micro branch portion is not extended, and the extended region in FIGS. 8B and 8C is viewed brighter than the non-extended region in FIG. 8A.

FIG. 9A to 9D are top plan views illustrating exemplary embodiments of the invention and a comparative embodiment, FIGS. 10A to 10D are images showing a liquid crystal control degree for an intermediate grayscale of the embodiments of FIGS. 9A to 9D, FIGS. 11A to 11D are images showing a liquid crystal control degree for a high grayscale of the embodiments in FIGS. 9A to 9D, FIG. 12 is a graph showing transmittance increase in the embodiments of FIGS. 9A to 9D, and FIG. 13 is a graph showing a response waveform of the embodiments of FIGS. 9A to 9D.

Further, FIGS. 14A to 14D are images showing a liquid crystal control degree for an intermediate grayscale having an oblique bruising characteristic in the embodiments of FIGS. 9A to 9D, FIGS. 15A to 15B are images showing a liquid crystal control degree for a high grayscale having the oblique bruising characteristic in high grayscale images in the embodiments of FIGS. 9A to 9D, FIG. 16 is a graph showing transmittance increase for the oblique bruising characteristic in the embodiments of FIGS. 9A to 9D, and FIG. 17 is a graph showing a response waveform for a bruising characteristic of the embodiments of FIGS. 9A to 9D.

Figure 9A:
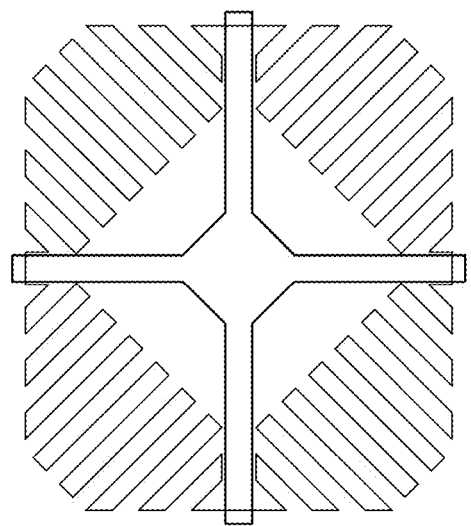
FIG. 9A to 9D are top plan views illustrating exemplary embodiments of the invention and a comparative embodiment.
Figure 9B:
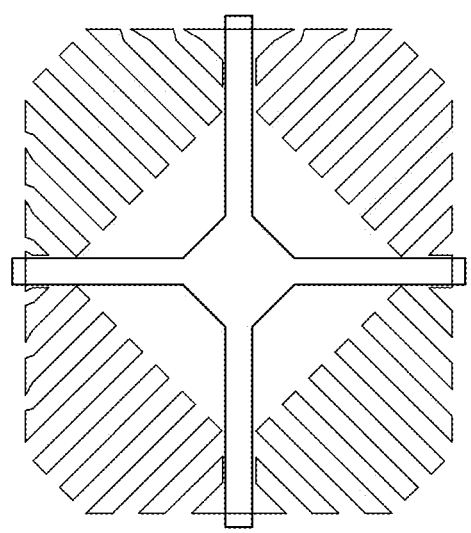
Figure 9C:
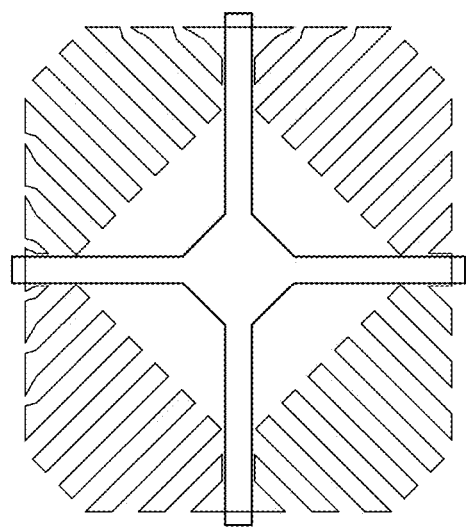
Figure 9D:
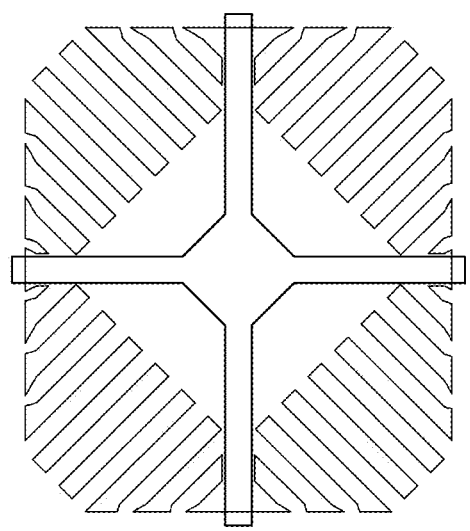
Figure 10A:
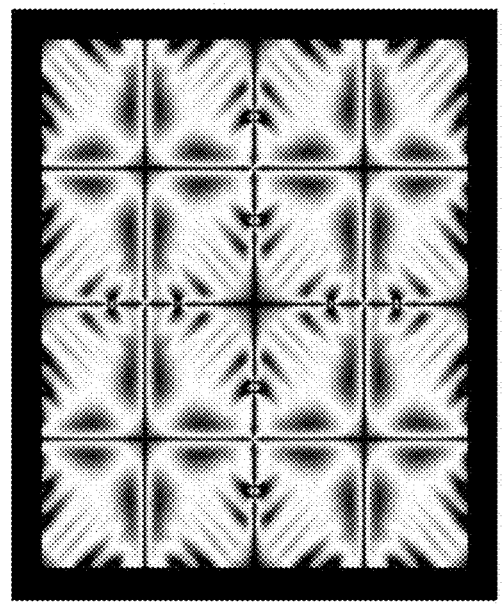
FIGS. 10A to 10D are images showing a liquid crystal control degree for an intermediate grayscale in the embodiments of FIGS. 9A to 9D.
Figure 10B:
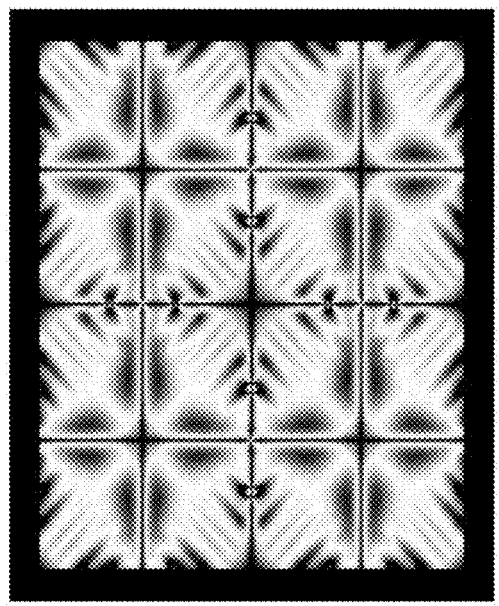
Figure 10C:
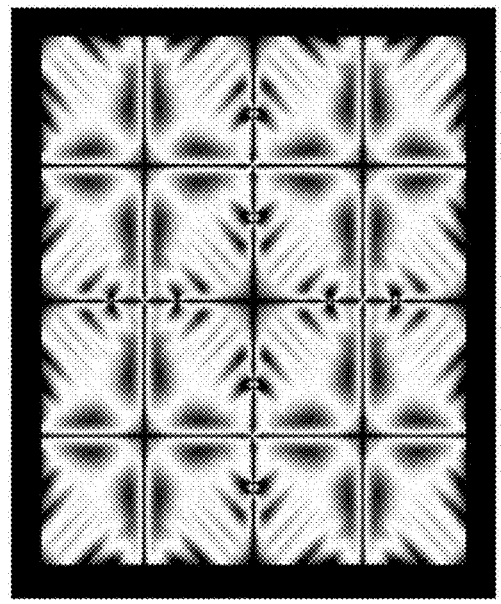
Figure 10D:
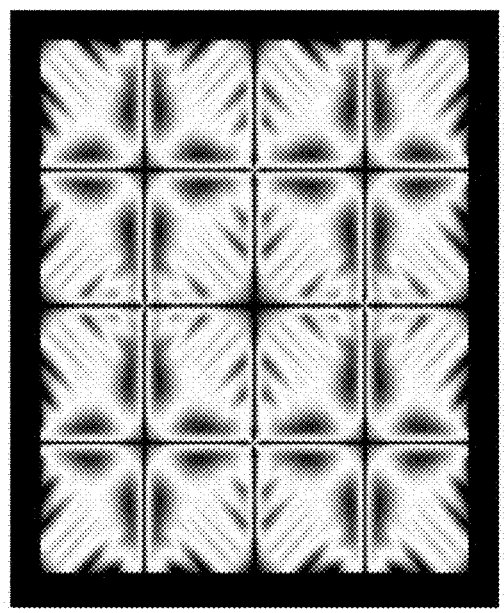
Figure 11A:
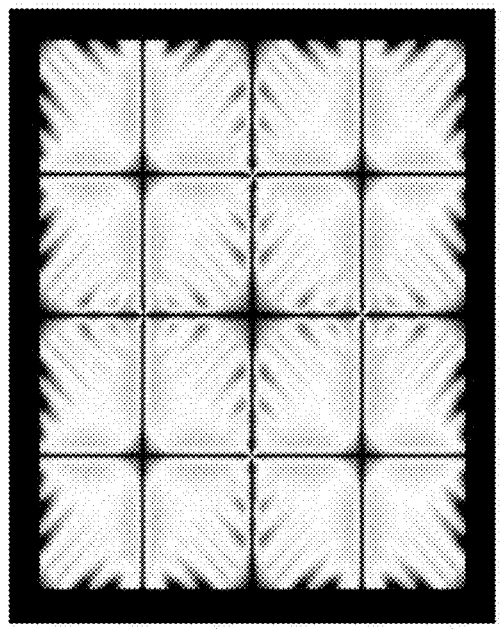
FIGS. 11A to 11D are images showing a liquid crystal control degree for a high grayscale in the embodiments of FIGS. 9A to 9D.
Figure 11B:
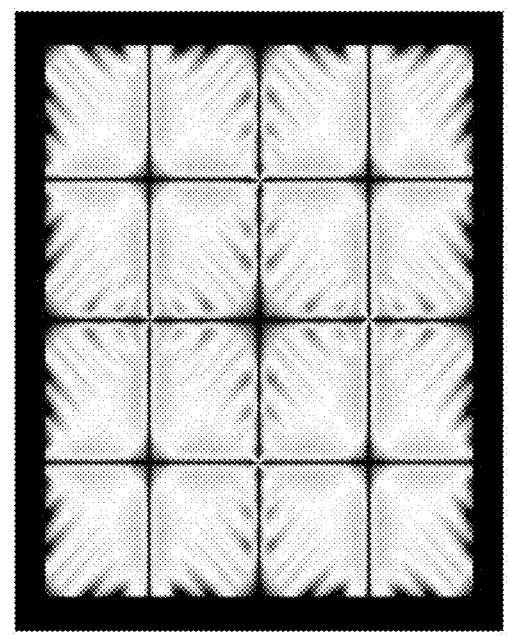
Figure 11C:
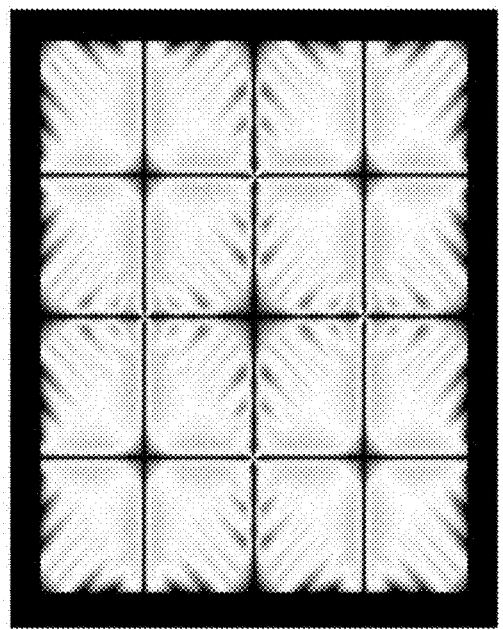
Figure 11D:
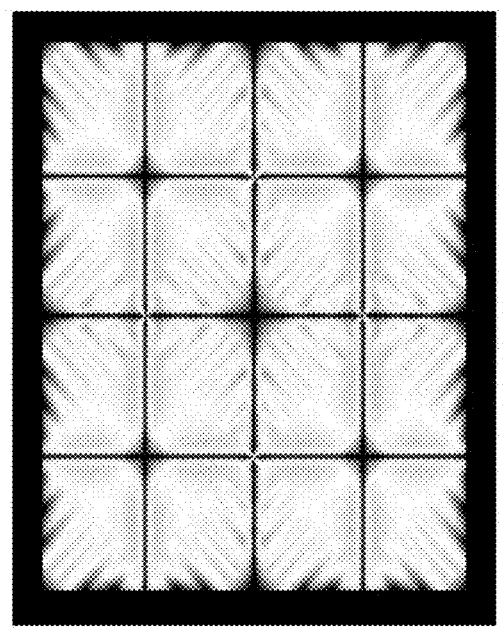

Particularly, FIG. 9A shows an comparative embodiment in which the lower panel unit electrode includes a chamfered shape, and the micro branch portion is not extended, FIG. 9B shows an exemplary embodiment of the invention, in which the region of the micro branch portion corresponding to the border of the pixel electrode, here, an upper border and a left border, is extended by about 0.5 μm, FIG. 9C shows an alternative exemplary embodiment of the invention, in which only the region of the micro portion corresponding to the border of the pixel electrode is extended by about 1 μm, and FIG. 9D shows another alternative exemplary embodiment of the invention, in which the region of the micro branch portion corresponding to the border of the pixel electrode is extended by about 1 μm, and the region of the micro branch portion of the right and lower border, which does not correspond to the border of the pixel electrode is extended by about 0.5 μm.

As described above, FIGS. 10A to 10D are images showing a liquid crystal control degree for an intermediate grayscale in the embodiments of FIGS. 9A to 9D, FIGS. 11A to 11D are images showing a liquid crystal control degree for a high grayscale in the embodiments of FIGS. 9A to 9D. As shown in FIGS. 10A to 11D, the generation of the texture is substantially decreased in the embodiments shown in FIGS. 9B, 9C and 9D including the extended micro branch portion, compared to the embodiments shown in FIG. 9A. In an exemplary embodiment, where the micro branch portion at both the outer side and the internal side are extended, the liquid crystal control is substantially improved when the degrees of the extension are different as shown in FIG. 9D, such that the generation of the texture in a boundary region is substantially decreased.

Figure 12:
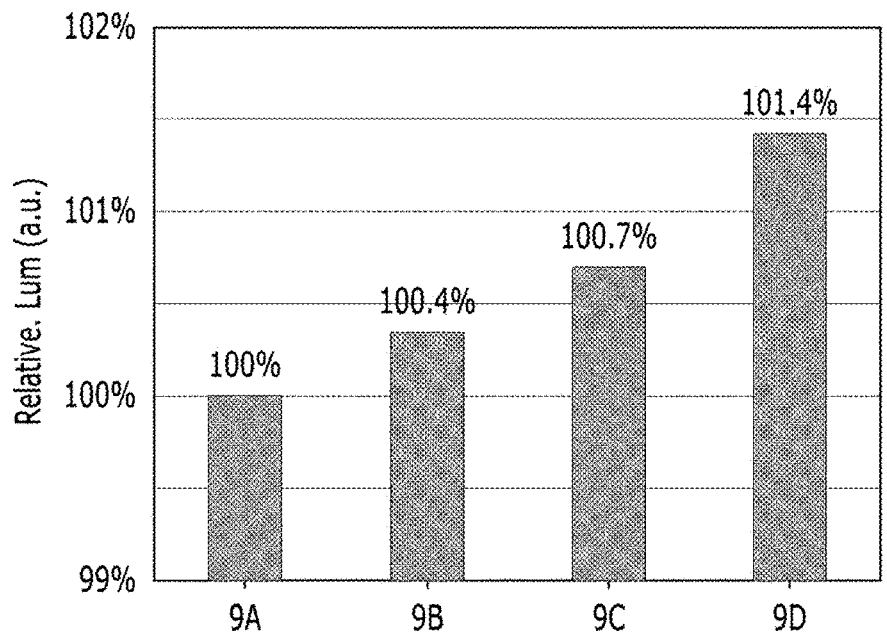
FIG. 12 is a graph showing transmittance increase in the embodiments of FIGS. 9A to 9D.

FIG. 12 shows relative transmittance, e.g., relative luminance ("Lum"), for each case of FIGS. 9A to 9D. When transmittance of FIG. 9A is about 100%, transmittance of FIG. 9B is about 100.4%, transmittance of FIG. 9C is about 100.7%, and transmittance of FIG. 9D is about 101.4%. That is, transmittance is increased by a maximum of about 1.4% in the embodiment where the micro branch portion is extended.

Figure 13:
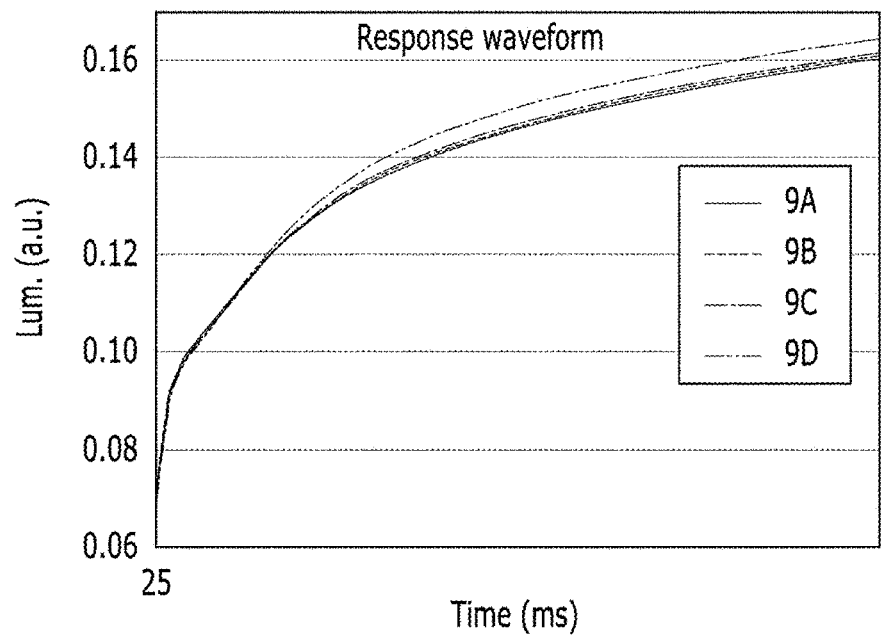
FIG. 13 is a graph showing a response waveform of the embodiments of FIGS. 9A to 9D.

FIG. 13 shows a response waveform graph for each embodiment of FIGS. 9A to 9D, and the comparative embodiment of FIG. 9A, in which the micro branch portion is not extended, represents the slowest response waveform, and a response speed is improved in the order of FIGS. 9B, 9C and 9D. Particularly, the exemplary embodiment of the invention of FIG. 9B represents the response speed having substantially the same degree as the embodiment of FIG. 9A, but the response speed in the exemplary embodiment of the invention shown in FIG. 9D including the non-uniform extension is improved by about 6.4% or more, compared to the comparative embodiment shown in FIG. 9A.

As described above, when the pixel electrode includes the extended micro branch portion, the response speed is increased, and the response speed is substantially improved in an exemplary embodiment where the outer side and the internal side of the micro branch portion are extended and the degrees of the extension are different or non-uniform.

Figure 14A:
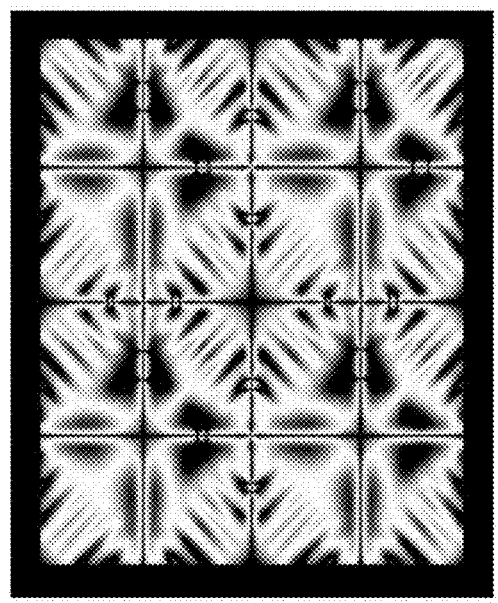
FIGS. 14A to 14D are images showing a liquid crystal control degree for an intermediate grayscale having an oblique bruising characteristic in the embodiments of FIGS. 9A to 9D.
Figure 14B:
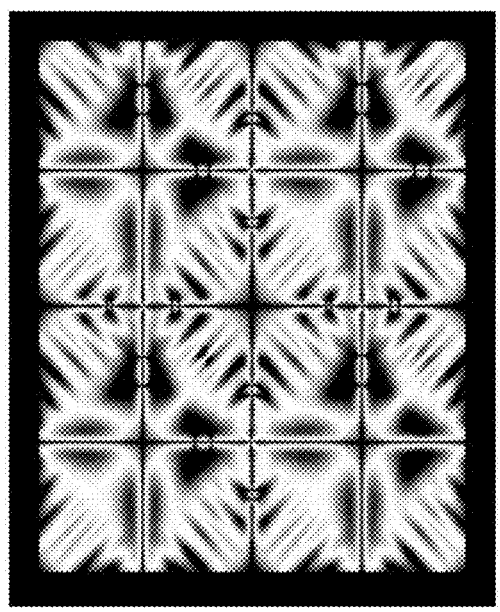
Figure 14C:
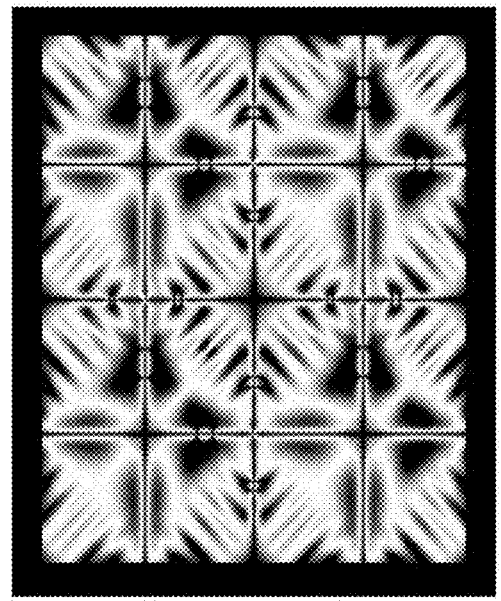
Figure 14D:
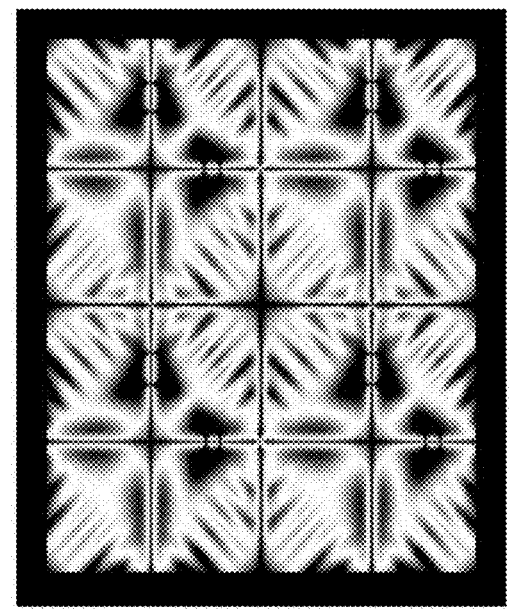
Figure 15A:
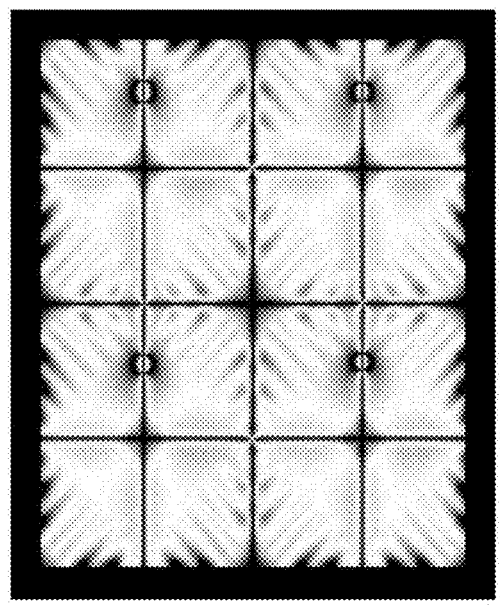
FIGS. 15A to 15D are images showing a liquid crystal control degree for a high grayscale having the oblique bruising characteristic in high grayscale images in the embodiments of FIGS. 9A to 9D.
Figure 15B:
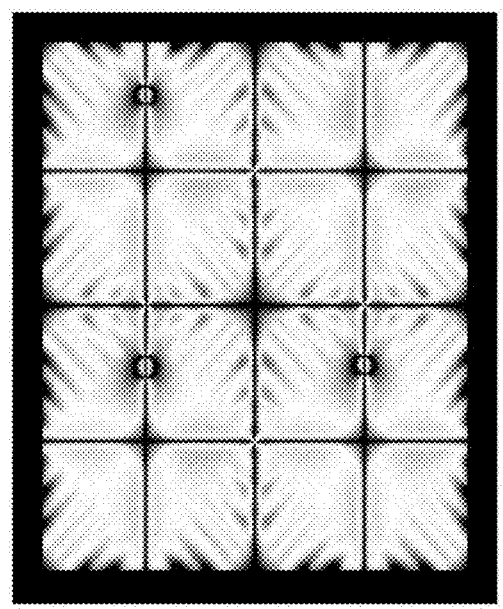
Figure 15C:
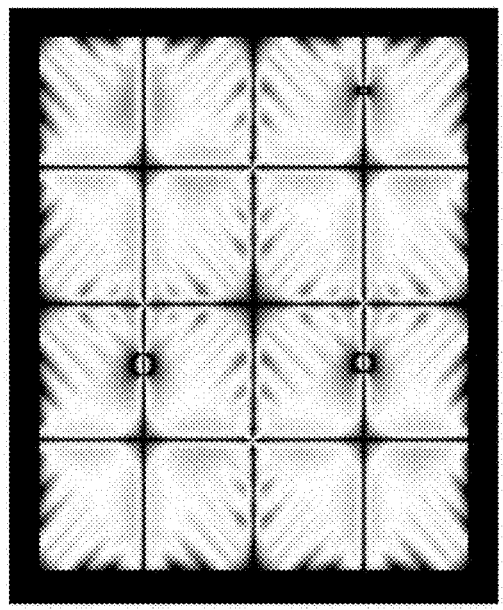
Figure 15D:
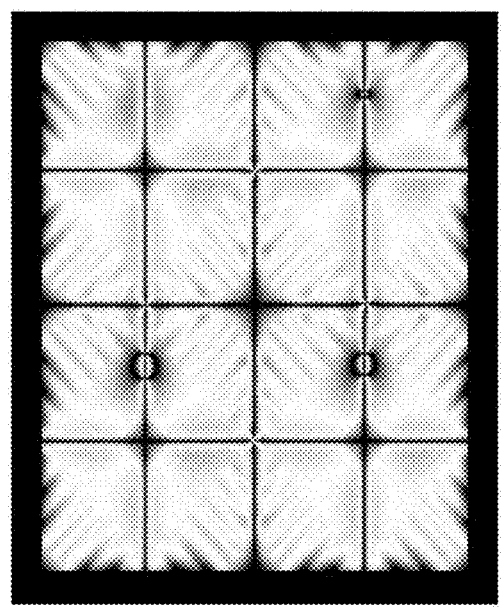

In FIGS. 14A to 14D, an oblique bruising characteristic in an intermediate grayscale for each embodiment of FIGS. 9A to 9D are shown, and in FIGS. 15A to 15D, an oblique bruising characteristic in a high grayscale for each embodiment of FIGS. 9A to 9D are shown. As shown in FIGS. 14A to 14D, the liquid crystal control becomes substantially uniform in the exemplary embodiment of the invention shown in FIG. 9D compared to the comparative embodiment shown in FIG. 9A. As shown in FIGS. 14A to 14D, the texture positioned at the upper side in the intermediate grayscale is substantially removed in the exemplary embodiment of the invention shown in FIG. 14D compared to the comparative embodiment shown in FIG. 14A. Similarly, as shown in FIGS. 15A to 15D, the texture positioned at the upper side in the high grayscale is substantially removed in the exemplary embodiment of the invention shown in FIG. 15D compared to the comparative embodiment shown in FIG. 15A.

Figure 16:
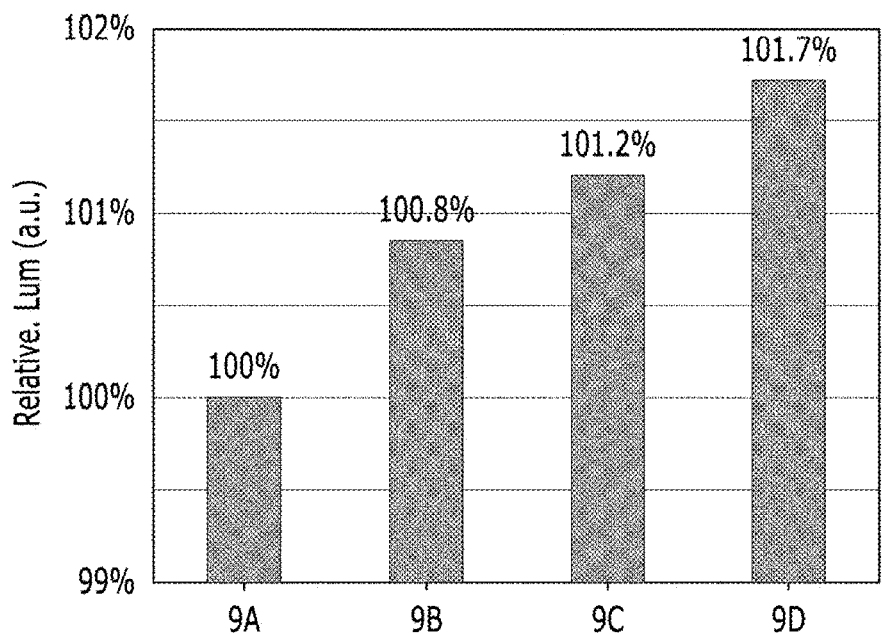
FIG. 16 is a graph showing transmittance increase in the oblique bruising characteristic in the embodiments of FIGS. 9A to 9D.

The graph shown in FIG. 16 represents relative transmittance of the embodiments shown in FIGS. 9A to 9D based on the oblique bruising characteristic. As shown in FIG. 16, when the comparative embodiment shown in FIG. 9A has a reference transmittance, e.g., relative transmittance of 100%, the exemplary embodiment of the invention shown in FIG. 9B has relative transmittance of 100.8%, the exemplary embodiment of the invention shown in FIG. 9C has relative transmittance of about 101.2%, and the exemplary embodiment of the invention shown in FIG. 9D has relative transmittance of about 101.7%. Accordingly, the transmittance is improved by a maximum of about 1.7% in the exemplary embodiment of the invention shown in FIG. 9D in which the micro branch portion is asymmetrically extended, compared to the comparative embodiment shown in FIG. 9A, where the micro branch portion is not extended.

Figure 17:
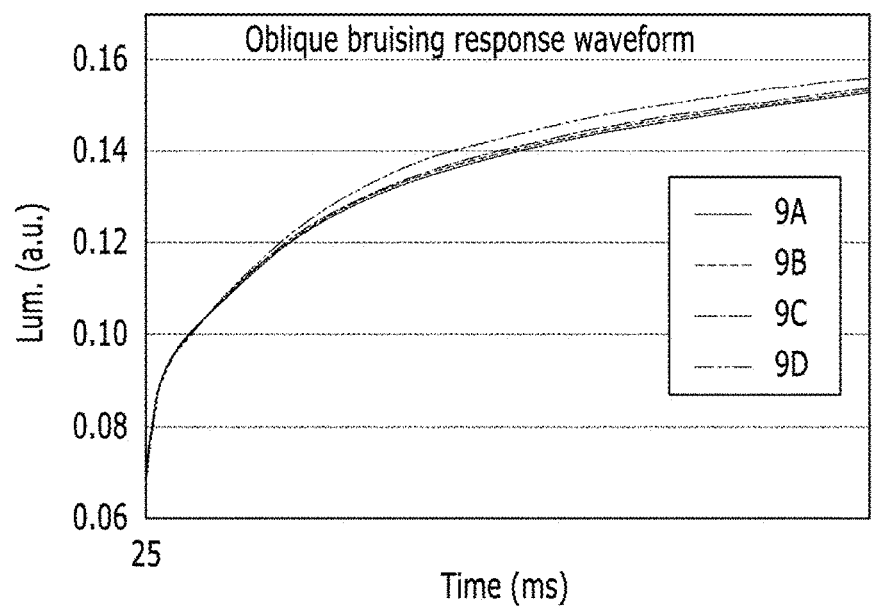
FIG. 17 is a graph showing a response waveform of a bruising characteristic of the embodiments of FIGS. 9A to 9D.

Further, FIG. 17 illustrates a response waveform for a bruising characteristic of the embodiments of FIGS. 9A to 9D, and the response speed is improved in an order from FIG. 9A to FIGS. 9B, 9C, and 9D. As shown in FIG. 17, the response speed is improved by about 3.6% in the exemplary embodiment of the invention shown in FIG. 9D, compared to the comparative embodiment shown in FIG. 9A.

According exemplary embodiments described herein, where the micro branch portion is extended, the liquid crystal control is substantially improved, the texture is substantially decreased, and the transmittance and the response speed are substantially improved. In such embodiment, where the liquid crystal display includes the micro branch portion in which the region corresponding to the border of the unit pixel electrodes and the region not-corresponding to the border of the unit pixel electrodes are asymmetrically extended, the liquid crystal control is substantially improved, the texture is substantially decreased, and the transmittance and the response speed are substantially improved.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a lower panel electrode comprising a lower panel unit electrode;
   an upper panel electrode comprising an upper panel unit electrode, which overlaps the lower panel unit electrode; and
   a liquid crystal layer disposed between the lower panel electrode and the upper panel electrode,
   wherein the lower panel unit electrode comprises:
     a stem portion which defines a boundary between a plurality of sub-regions defined therein;
     a center pattern disposed at a center of the stem portion and which overlaps the plurality of sub-regions; and
     a plurality of micro branch portions which extends from the center pattern, wherein extending directions of the plurality of micro branch portions in different regions are different from each other,
   wherein an end portion of the plurality of micro branch portions is extended in a direction different from an extending direction thereof such that a width of a gap between two adjacent micro branch portions is non-uniform, and
   wherein the upper panel unit electrode comprises an opening overlapping the stem portion and having a cross-like shape.

2. The liquid crystal display of claim 1, wherein
   the lower panel electrode comprises a plurality of lower panel unit electrodes, and
   a width of a gap between adjacent lower panel unit electrodes is substantially non-uniform.

3. The liquid crystal display of claim 1, wherein
   the lower panel electrode comprises a plurality of lower panel unit electrodes, and an end portion of the plurality of micro branch portions corresponding to a border of the plurality of lower panel unit electrodes is extended in a direction substantially parallel to the border.

4. The liquid crystal display of claim 3, wherein an end portion of the plurality of micro branch portions corresponding to the border of the plurality of lower panel unit electrodes is extended further than an end portion of micro branch portions corresponding to a side of the lower panel unit electrode.

5. The liquid crystal display of claim 1, wherein a corner of the lower panel unit electrode is chamfered.

6. The liquid crystal display of claim 5, wherein the lower panel electrode comprises a plurality of lower panel unit electrodes, a width of a gap between adjacent lower panel unit electrodes is increased as being closer to the corner of the plurality of lower panel unit electrodes.

7. The liquid crystal display of claim 1, wherein the lower panel electrode comprises a plurality of lower panel unit electrodes, the lower panel electrode further comprises a first connection portion which connects the plurality of lower panel unit electrodes to each other.

8. The liquid crystal display of claim 1, further comprising:
a pixel comprising a first subpixel and a second subpixel, which are configured to output an input image signal with substantially a same luminance as each other or different luminances from each other,
the first subpixel and the second subpixel comprises the lower panel electrode and the upper panel electrode, respectively,
the lower panel electrode comprises a plurality of lower panel unit electrodes, and
the number of the lower panel unit electrodes in the second subpixel is greater than the number of the lower panel unit electrodes in the first subpixel.

9. The liquid crystal display of claim 8, further comprising:
a first connection portion configured to connect adjacent lower panel unit electrodes in a horizontal direction to each other; and
a second connection portion configured to connect adjacent lower panel unit electrodes in a vertical direction to each other.

10. The liquid crystal display of claim 1, wherein an angle between the plurality of micro branch portions and a horizontal direction is less than about 45 degrees.

11. The liquid crystal display of claim 1, further comprising:
a first insulating substrate;
a gate line disposed on the first insulating substrate;
a data line disposed on the first insulating substrate, wherein the data line crosses the gate line and insulated from the gate line; and
a color filter disposed on the gate line and the data line.

12. The liquid crystal display of claim 11, further comprising:
a thin film transistor connected to the gate line and the data line.

13. The liquid crystal display of claim 11, wherein the lower panel electrode is disposed on the color filter, and
the lower panel electrode comprises a first subpixel electrode and a second subpixel electrode, which are spaced apart from each other with the gate line interposing therebetween.

14. The liquid crystal display of claim 13, further comprising:
a first thin film transistor connected to the gate line and the data line and the first subpixel electrode; and
a second thin film transistor connected to the gate line and the data line and the second subpixel electrode.

* * * * *